United States Patent [19]

Anderson

[11] 4,390,655

[45] Jun. 28, 1983

[54] STABILIZED ETHYLENE/TETRAFLUOROETHYLENE COPOLYMERS

[75] Inventor: Jerrel C. Anderson, Vienna, W. Va.

[73] Assignee: E. I. Du Pont de Nemours & Co., Wilmington, Del.

[21] Appl. No.: 374,616

[22] Filed: May 3, 1982

Related U.S. Application Data

[63] Continuation-in-part of Ser. No. 257,107, Apr. 24, 1981, abandoned.

[51] Int. Cl.$^3$ ................................................ C08K 3/16
[52] U.S. Cl. .................................. 524/413; 524/546
[58] Field of Search ............................................ 524/413

[56] References Cited

U.S. PATENT DOCUMENTS 4,110,308  8/1978  Abe et al. ............................ 524/413

Primary Examiner—V. P. Hoke

[57] ABSTRACT

Presence of cuprous iodide or cuprous chloride provides protection to ethylene/tetrafluoroethylene polymers against thermal degradation.

7 Claims, No Drawings

STABILIZED ETHYLENE/TETRAFLUOROETHYLENE COPOLYMERS

CROSS REFERENCE TO RELATED APPLICATIONS

This application is a continuation-in-part of application Ser. No. 257,107 filed Apr. 24, 1981, now abandoned.

FIELD OF THE INVENTION

This invention relates to an ethylene-tetrafluoroethylene copolymer which is stabilized against thermal degradation, and more particularly to an ethylene-tetrafluoroethylene copolymer which is stabilized against thermal degradation by addition of CuI or CuCl.

BACKGROUND OF THE INVENTION

Ethylene-tetrafluoroethylene copolymers have good thermal, chemical, electrical and mechanical properties and are melt-processible. These copolymers are known to be heat-resistant thermoplastic resins which have a melting point of 260° to 300° C. However, the copolymers thermally deteriorate and become colored, brittle and foamed when heated to a temperature higher than the melting point for a long period of time. Accordingly, it is desirable to prevent the thermal deterioration of ethylene-tetrafluoroethylene copolymers during the conventional operation of injection molding and extrusion molding processes.

U.S. Pat. No. 4,110,308 discloses that a copper compound, such as metallic copper, cupric oxide or cuprous oxide, cupric nitrate, cupric chloride or copper alloys, stabilize the copolymers against degradation at elevated temperatures.

SUMMARY OF THE INVENTION

It has now been found that cuprous chloride or cuprous iodide provide better protection to ethylene-tetrafluoroethylene copolymers (E/TFE copolymers hereinafter) against thermal degradation than the metallic copper or cupric oxides disclosed in U.S. Pat. No. 4,110,308, and therefore can be employed at lower concentrations, thus avoiding detrimental pigmentation and the like.

Addition of cuprous chloride or iodide to an E/TFE copolymer allows the copolymer to be exposed to very high temperatures in air without rapid loss in weight, molecular weight deterioration, color or bubble generation. Such protection greatly improves E/TFE copolymers utility for such applications as rotomolding, surface coating, molding, and wire insulation, where high temperatures are involved in manufacture and/or use.

For example, in rotomolding the E/TFE powder is subjected to temperatures well above the melting point for up to an hour with oxygen generally present. Under such conditions, untreated E/TFE powders turn brown, foam, and become exceedingly brittle because of molecular weight reduction. The addition of small amounts of cuprous chloride or iodide prevents such degradation.

DESCRIPTION

The ethylene-tetrafluoroethylene copolymers used in the invention can be prepared by various well-known polymerization methods such as emulsion polymerization in an aqueous medium or suspension polymerization. The ratio of ethylene to tetrafluoroethylene units can be conventionally varied and it is possible to combine a small amount (e.g., up to 20 mole percent) of a copolymerizable ethylenically unsaturated comonomer of 3-12 carbon atoms, such as propylene, isobutylene, vinyl fluoride, hexafluoropropylene, chlorotrifluoroethylene, acrylic acid, alkyl esters thereof, chloroethyl vinyl ether, perfluoroalkyl perfluorovinyl ethers, perfluorobutyl ethylene, and the like and other copolymerizable compounds such as hexafluoroacetone. The ratio of ethylene to tetrafluoroethylene units in the copolymer may vary over wide limits. For example, the mole ratio of tetrafluoroethylene to ethylene units may be from 40/60-70/30, and preferably from about 45/55-60/40.

The cuprous chloride or iodide provides outstanding oxidation inhibition for E/TFE resins over the concentration range of 0.05 to 500 ppm, preferably 5-50 ppm, as copper. The protection is the same through this range whether at 5 ppm or 50 ppm. Copper in other forms is not as potent at lower concentrations; for example, Cu powder, $Cu_2O$, and CuO all provide protection but become effective only at higher concentrations of 50 ppm or more. There are important advantages gained at the lower concentrations: (1) pigmentation by the additive is minimized, (2) conversion of the halide to black cupric oxide at high temperatures is not as noticeable, (3) problems such as surface roughening, haziness, and electrical flaws are avoided.

E/TFE resins stabilized with CuI or CuCl can be heated in air above their melting point and maintained there for 2 hours and more without significant losses in molecular weight (toughness) or color.

Another advantage of using the halides, and particularly CuI, is their ability to greatly stabilize E/TFE melts during processing; thereby allowing greater holdup times without losses in end-product molecular weight.

Inclusion of the cuprous halides in E/TFE resins also improves stress cracking resistance in high temperature applications. Color degradation is also slowed remarkably. For example, 5 ppm CuI retains 90 percent of its initial room temperature elongation after 215 hours of aging at 230° C., whereas a control (no Cu) lasts for only 27 hours, and a sample containing 50 ppm Cu metal powder lasts just 70 hours. Use of cuprous chloride or iodide in E/TFE finished articles provides good protection against thermally induced cracking for up to 400 hours of aging at 230° C. Better protection should be expected at lower temperatures.

It is preferable to optimize the particle size, the specific surface area, and the particle distribution of the cuprous halide in accordance with the desired properties of the copolymer composition. For example, it is preferable to use a cuprous halide having a relatively small average particle diameter, usually less than 100 micron and preferably about 1-50 micron. It is also preferable to have a sharp particle distribution.

Various methods can be employed for blending the cuprous halide with the E/TFE. For example, commercially available CuI or CuCl powder can be blended with the copolymer in a mixer. An aqueous slurry or organic solvent slurry of ethylene-tetrafluoroethylene copolymer and CuI or CuCl can also be prepared.

EXAMPLES

In the Examples, the E/TFE copolymer designated E/TFE-I was a copolymer of ethylene/tetrafluoroethylene/hexafluoroacetone (21.3/72.9/5.8 wt percent) having a melt viscosity of $18 \times 10^4$ poise and a melting point of 262° C. The copolymer was in the form of a partially compacted friable powder.

The E/TFE copolymer designated E/TFE-II was a copolymer of ethylene/tetrafluoroethylene/perfluorobutyl ethylene (18.9/78.2/2.9) having a melt viscosity of $5.85 \times 10^4$ poise, in powder form.

EXAMPLE 1 AND COMPARISONS

The following powdered additives were employed:
(1) cuprous iodide, CuI
(2) copper metal
(3) cupric oxide, CuO
(4) α-Al$_2$O$_3$
(5) ZnO
(6) CuI/KI mixture adsorbed on α-Al$_2$O$_3$
(7) cupric nitrate adsorbed on α-Al$_2$O$_3$
(8) CuI/KI mixture The different powdered additives were added to E/TFE-I powder in a blender along with enough trifluoro-1,1,2-tri-chloroethane (F-113) solvent to produce a fluid slurry. After mixing at high speed for 1 minute, the slurry was poured into a pan and the F-113 was allowed to evaporate. The resultant powder cake was then dried for 1 hour under vacuum at 120° C.

Evaluations—Two grams of each mixture were weighed onto a watch glass and all the mixtures prepared were heated together at 300° C. for two hours in an oven using constantly circulating air. At 300° C., the E/TFE-I powder is well above its melting point of 262° C. The cooled mixtures were examined for signs of degradation such as color generation, foaming, and cracking.

Results—The results are tabulated below in order of good to bad performance:

| Example (number) or Comparison (letter) | Additive | Additive Concentration | Observations |
|---|---|---|---|
| 1 | CuI | 50ppm as copper | No discoloration. No foaming. |
| A | CuI/KI/αAl$_2$O$_3$ | 1000ppm of total mix | Slight yellowing. No foaming. |
| B | CuI/KI/αAl$_2$O$_3$ washed | 1000ppm of total mix | Slight yellowing. No foaming. |
| C | Cu(NO$_3$)$_2$ adsorbed on αAl$_2$O$_3$ (unwashed) | 1000ppm of total mix | Center of sample yellowish-white. Edges more yellow with brownish areas. Slight amount of foaming. |
| D | Cu powder | 50ppm as copper | Splotchy yellow with brown ring around edge of sample. Considerable foaming. |
| E | None | — | Uniformly honey-colored yellow with brownish perimeter. Heavy foaming. |
| F | CuO | 50ppm as copper | Reddish-yellow with reddish-brown ring around the perimeter. Considerable foaming. |
| G | Cu(NO$_3$)$_2$/ αAl$_2$O$_3$ (washed) | 1000ppm of total mix | Yellowish-white in center with dark brown ring around the perimeter. Heavy foaming. |
| H | αAl$_2$O$_3$ | 566ppm | Yellowish-white in center with dark brown ring around the perimeter. Excessive foaming. |
| I | αAl$_2$O$_3$ | 1000ppm | Yellowish-white in center with dark brown ring around the perimeter. Excessive foaming. |
| J | ZnO | 50ppm of Zn | Uniformly dark reddish-brown. Excessive foaming. |
| K | CuI/KI | 50ppm as copper 750ppm KI | Dark reddish-brown color. Excessive foaming. |

These results show cuprous iodide (Example 1) gives outstanding protection against oxidation. Its performance is much better than that for any of the other tested additives (Comparisons A-K). Based on the visual observations, CuI, CuI/KI/Al$_2$O$_3$, Cu(NO$_3$)$_2$ adsorbed on α-Al$_2$O$_3$ in unwashed form, and copper metal powder rendered some protection, but CuO, Cu(NO$_3$)$_2$ adsorbed on α-Al$_2$O$_3$ in washed form, αAl$_2$O$_3$, ZnO, and CuI/KI actually accelerated E/TFE-I degradation.

EXAMPLE 2

Experimental—E/TFE-I powder samples were prepared in the same way described in Example 1. Samples containing CuI, CuCl, CuBr, Cu, Cu$_2$O, CuO, at 5, 50, 500, and 1000 ppm as copper were studied. Other additives tested were CuCl$_2$.2H$_2$O and CuBr$_2$ at 5, 50, and 500 ppm as copper plus CuF$_2$.2H$_2$O as 50 ppm copper, CuI as 50 ppm copper mixed with 749 ppm KI, 1000 and 300 ppm α-Al$_2$O$_3$, 1000 ppm of Cu(NO$_3$)$_2$/α-Al$_2$O$_3$ mixtures both washed and unwashed, and 1000 ppm of CuI/KI/α-Al$_2$O$_3$ mixtures both washed and unwashed.

The additive particle size distributions were measured using the Sedigraph and Coulter Counter techniques. The average particle size in microns for each additive type follows: Cu metal powder, 42; Cu$_2$O, 13; CuO, 7; CuI, 19.7; CuCl$_2$ 2H$_2$O, 14.6; α-Al$_2$O$_3$, 11.4.

Each sample, in the amount of 2 grams, was placed on a watch glass, weighed, and then subjected to two hours of heat aging at 300° C. in circulating air. Once cooled, each sample was photographed and then weighed to determine the amount of any weight loss. The samples, as a group, were then subjected to another 2 hour aging in the 300° C. oven, cooled, photographed, and weighed again. This procedure was repeated six times giving the samples 12 hours of exposure time in the 300° C. oven.

Results—Wide differences in stability were evident after the first two hour exposure. The control resin with no additives turned dark brown and foamed excessively. Of those samples containing 5 ppm copper, the CuI and CuCl ones exhibited no color change or foaming. The CuCl$_2$.2H$_2$O sample displayed no foaming but incurred slight yellowing and some weight loss. Of the remaining samples, CuBr prevented foaming but allowed some yellowing, while Cu metal, Cu$_2$O, CuO, and CuBr$_2$ allowed some foaming and considerable color development.

At 50 ppm copper, all the additives except Cu$_2$O, CuO, CuF$_2$.2H$_2$O and Cu metal prevented both color and bubble formation. At 500 and 1000 ppm, all the additives gave good protection.

The CuI samples containing 500 and 1000 ppm copper turned grey and black, respectively, after the first two hour aging. The darkening is due not to degradation of the polymer, but is instead the result of cupric oxide (black) formation. These samples did not darken further with continued oven exposures. Evidence for CuO formation was also seen in the CuCl, CuBr, and Cu$_2$O samples. Of these, the CuI was the most reactive toward oxygen.

The weight loss with time for the various samples is tabulated in Table 1.

At 5 ppm copper, Table 1 shows a wide range of additive effectiveness with CuI being the most powerful inhibitor followed in order of decreasing activity by CuCl, CuCl$_2$.2H$_2$O, CuBr, Cu$_2$O, CuBr$_2$ and CuO. The CuI and CuCl compounds are by far the most effective additives: (1) they protect the longest against color formation (4–6 hours), (2) prevent foaming up to 6 hours for CuI and 4 hours for CuCl, (3) maintain the initial low rate of weight loss the longest and (4) give the lowest ultimate (12 hours) weight loss.

At 50 ppm, the order of effectiveness remains essentially the same. Here the sample containing copper metal gives the least protection. The overall order of effectiveness from best to poorest: CuI CuCl, CuBr CuCl$_2$.2H$_2$O, Cu$_2$O CuBr$_2$, CuO, and Cu metal.

At 500 ppm, all the additives showed some effectiveness. However, at this loading, many of the additives pigment the resin. This pigmentation is undesirable in many applications. The CuO turns the resin grey, the CuI tan, and the Cu$_2$O pink. From the pigmentation standpoint, CuCl lends the least color with the maximum protection and does not blacken to CuO nearly as much as the CuI. Of all the additives, copper metal pigments least but does not render adequate protection for the E/TFE-I.

TABLE 1

| Example (number) or Comparison (letter) | Add. Type | Add. Conc. (ppm as Cu) | % Weight Loss with Oven Exposure Time at 300° C. | | | | | |
|---|---|---|---|---|---|---|---|---|
| | | | 2 hours | 4 hours | 6 hours | 8 hours | 10 hours | 12 hours |
| 2-1 | CuI | 5 | 0.15 | 0.35 | 1.02 | 1.96 | 2.72 | 3.58 |
| 2-2 | CuCl | 5 | 0.23 | 0.81 | 1.76 | 2.75 | 3.79 | 4.69 |
| A | None | 0 | 1.71 | 3.61 | 5.97 | 8.00 | 9.54 | 11.18 |
| B | CuCl$_2$ | 5 | 0.48 | 1.67 | 2.91 | 4.20 | 5.31 | 6.56 |
| C | CuBr | 5 | 0.48 | 1.80 | 3.02 | 4.46 | 5.87 | 7.00 |
| D | Cu$_2$O | 5 | 0.88 | 2.33 | 3.72 | 4.93 | 6.07 | 7.39 |
| E | CuBr$_2$ | 5 | 1.15 | 2.51 | 3.99 | 5.27 | 6.48 | 7.45 |
| F | CuO | 5 | 2.06 | 3.86 | 5.67 | 7.27 | 8.52 | 9.87 |
| 2-3 | CuI | 50 | 0.12 | 0.26 | 0.60 | 1.00 | 1.53 | 2.22 |
| 2-4 | CuCl | 50 | 0.10 | 0.25 | 0.56 | 1.03 | 1.69 | 2.45 |
| G | CuCl$_2$ | 50 | 0.11 | 0.48 | 1.18 | 2.15 | 3.00 | 4.29 |
| H | CuBr | 50 | 0.18 | 0.63 | 1.35 | 2.20 | 3.02 | 3.96 |
| I | Cu$_2$O | 50 | 0.43 | 1.04 | 1.96 | 3.27 | 4.51 | 5.81 |
| J | CuBr$_2$ | 50 | 0.21 | 1.41 | 2.64 | 3.76 | 4.66 | 5.99 |
| K | CuF$_2$ | 50 | 0.60 | 1.55 | 2.57 | 4.08 | 5.74 | 7.19 |
| L | CuO | 50 | 1.14 | 2.48 | 4.01 | 5.26 | 6.88 | 8.35 |
| M | Cu | 50 | 0.69 | 2.84 | 4.89 | 6.64 | 8.34 | 9.71 |
| N | CuI/KI | 50/749* | 1.23 | 3.70 | 6.41 | 8.91 | 10.84 | 13.16 |
| 2-5 | CuCl | 500 | 0.13 | 0.19 | 0.41 | 0.77 | 1.43 | 2.42 |
| 2-6 | CuI | 500 | 0.14 | 0.31 | 0.57 | 1.01 | 1.61 | 2.50 |
| O | Cu$_2$O | 500 | 0.11 | 0.25 | 0.62 | 1.24 | 2.03 | 2.81 |
| P | CuBr$_2$ | 500 | 0.16 | 0.37 | 0.73 | 1.31 | 2.06 | 3.03 |
| Q | CuBr | 500 | 0.15 | 0.31 | 0.78 | 1.39 | 2.31 | 3.34 |
| R | CuCl$_2$ | 500 | 0.23 | 0.62 | 1.21 | 2.23 | 3.13 | 4.41 |
| S | CuO | 500 | 0.26 | 0.73 | 1.49 | 2.38 | 3.53 | 4.67 |
| T | Cu | 500 | 0.34 | 1.00 | 1.78 | 3.05 | 4.28 | 5.43 |
| U | None | 0 | 1.71 | 3.61 | 5.97 | 8.00 | 9.54 | 11.18 |
| V | α-Al$_2$O$_3$* | 300 | 2.93 | 6.45 | 9.52 | 11.63 | 13.51 | 15.39 |
| V$_1$ | CuI | 1000 | 0.17 | 0.30 | 0.55 | 0.95 | 1.59 | 2.16 |
| V$_2$ | CuCl | 1000 | 0.15 | 0.28 | 0.50 | 0.90 | 1.60 | 2.17 |
| W | Cu$_2$O | 1000 | 0.13 | 0.24 | 0.57 | 1.09 | 1.80 | 2.54 |
| X | CuBr | 1000 | 0.16 | 0.37 | 0.94 | 1.65 | 2.57 | 3.64 |
| Y | CuO | 1000 | 0.19 | 0.50 | 1.02 | 1.69 | 2.55 | 3.68 |
| Z | CuI/KI/ α-Al$_2$O$_3$* (unwashed) | 1000 | 0.16 | 0.38 | 1.15 | 2.68 | 3.80 | 5.09 |
| A1 | Cu | 1000 | 0.20 | 0.82 | 1.54 | 2.87 | 4.15 | 5.15 |
| B1 | CuI/KI/ α-Al$_2$O$_3$* (washed) | 1000 | 0.13 | 0.30 | 1.18 | 3.16 | 4.61 | 6.10 |
| C1 | Cu/α-Al$_2$O$_3$* | 1000 | 1.69 | 4.24 | 6.24 | 8.47 | 10.12 | 11.52 |
| D1 | α-Al$_2$O$_3$* | 1000 | 3.20 | 7.44 | 10.61 | 13.43 | 15.39 | 17.34 |

*Total additive

EXAMPLE 3

Experimental—E/TFE-I samples were the same ones used in Example 2. Stabilized E/TFE-II samples were prepared the same way as the E/TFE-I samples (see Example 1), but several changes were made from the Example 1 procedure: (1) the powder samples were weighed directly into heat-cleaned (300° C. for 2 hours) aluminum weighing dishes rather than into watch glasses, in order to allow easy removal of the polymer discs after heat aging; (2) a larger sample (5.5 grams) was used to supply enough polymer for MV measurements; and (2) the samples were photographed against a white background in order to better compare color changes and differences.

Each sample was weighed into its aluminum dish using a gravimetric balance. All the samples were heat aged together in an air circulation oven set at 300° C. After aging, the samples were again weighed to determine the degree of weight loss. Each sample was then separated from the aluminum dish and photographed with the other samples.

Results—The weight loss results are tabulated in Tables 2 and 3.

The weight loss results for both E/TFE-I and E/TFE-II are largely parallel. A concentration dependence is evident for the Cu, $Cu_2O$ and CuO additives, whereas CuI and CuCl show no concentration dependence over the wide range of 5 to 500 ppm copper. More important, the CuI and CuCl are far more potent stabilizers than copper or its oxides at low concentrations.

Tabulating weight loss as a function of thermal aging time adequately distinguishes relative stabilizing powers.

TABLE 2

COPPER-STABILIZED E/TFE-I POWDER EFFECT OF HEAT AGING (300° C.) ON SAMPLE WEIGHT

| Example (number) or Comparison (letter) | Add. Type | Add. Conc. (ppm as Cu) | % Weight Loss with Oven | | |
|---|---|---|---|---|---|
| | | | ½ hours | 1 hour | 1½ hours |
| 3-1 | CuI | 5 | 0.071 | 0.078 | 0.16 |
| 3-2 | CuI | 50 | 0.049 | 0.082 | 0.16 |
| 3-3 | CuI | 500 | 0.075 | 0.1125 | 0.20 |
| 3-4 | CuCl | 5 | 0.055 | 0.090 | 0.13 |
| 3-5 | CuCl | 50 | 0.059 | 0.078 | 0.15 |
| 3-6 | CuCl | 500 | 0.084 | 0.081 | 0.19 |
| A | None | 0 | 0.115 | 0.904 | 1.74 |
| B | Cu | 5 | 0.093 | 0.912 | 1.88 |
| C | Cu | 50 | 0.113 | 0.885 | 1.60 |
| D | Cu | 500 | 0.060 | 0.250 | 0.69 |
| E | $Cu_2O$ | 5 | 0.051 | 0.637 | 1.19 |
| F | $Cu_2O$ | 25 | 0.081 | 0.227 | 0.49 |
| G | $Cu_2O$ | 50 | 0.0638 | 0.214 | 0.51 |
| H | $Cu_2O$ | 500 | 0.071 | 0.133 | 0.16 |
| I | CuO | 5 | 0.104 | 0.844 | 1.56 |
| J | CuO | 50 | 0.084 | 0.720 | 1.20 |
| K | CuO | 500 | 0.086 | 0.205 | 0.47 |
| L | $CuCl_2.2H_2O$ | 50 | 0.096 | 0.096 | 0.16 |
| M | $Cu/\alpha-Al_2O_3$ (unwashed) | 1000* | 0.071 | 0.107 | 0.28 |
| N | $\alpha-Al_2O_3$ | 1000* | 0.113 | 0.672 | 2.10 |

*Concentration in PPM of total additive

TABLE 3

COPPER-STABILIZED E/TFE-II POWDER EFFECT OF HEAT AGING (300° C.) ON SAMPLE WEIGHT

| Example (number) or Comparison (letter) | Add. Type | Add. Conc. (ppm as Cu) | % Weight Loss with Oven | | |
|---|---|---|---|---|---|
| | | | ½ hours | 1 hour | 1½ hours |
| 3-7 | CuI | 5 | 0.033 | 0.029 | 0.065 |
| 3-8 | CuI | 50 | 0.044 | 0.037 | 0.092 |
| 3-9 | CuI | 500 | 0.025 | 0.048 | 0.080 |
| 3-10 | CuCl | 5 | 0.013 | 0.022 | 0.094 |
| 3-11 | CuCl | 50 | 0.013 | 0.033 | 0.085 |
| 3-12 | CuCl | 500 | 0.026 | 0.040 | 0.107 |
| A | None | 0 | 0.009 | 0.049 | 0.624 |
| B | Cu | 5 | 0.020 | 0.111 | 0.486 |
| C | Cu | 50 | 0.026 | 0.044 | 0.312 |
| D | Cu | 500 | 0.017 | 0.031 | 0.124 |
| E | $Cu_2O$ | 5 | 0.033 | 0.047 | 0.358 |
| F | $Cu_2O$ | 25 | 0.022 | 0.061 | 0.340 |
| G | $Cu_2O$ | 50 | 0.029 | 0.029 | 0.064 |
| H | $Cu_2O$ | 500 | 0.033 | 0.038 | 0.071 |
| I | CuO | 5 | 0.024 | 0.106 | 0.588 |
| J | CuO | 50 | 0.035 | 0.064 | 0.258 |
| K | CuO | 500 | 0.031 | 0.039 | 0.069 |
| L | $CuCl_2.2H_2O$ | 50 | 0.039 | 0.033 | 0.096 |
| M | $Cu/\alpha-Al_2O_3$ (unwashed) | 1000* | 0.011 | 0.031 | 0.087 |
| N | $\alpha-Al_2O_3$ | 1000* | 0.006 | 0.036 | 0.368 |

*Concentration in PPM of total additive

EXAMPLE 4

Experimental—CuI or CuCl was blended with E/TFE-I or II powder by tumble blending for 1 hour. The blends were then extruded through a 28 mm twin screw extruder.

The extruded samples were compression molded (at 300° C.) into 4"×4"×0.010" films. These films were cut into 2"×4" halves, and one half were subjected to thermal aging in air at 230° C. for a specified time. The other half were not aged and served as a control. A new film sample was molded for each aging cycle. The unaged and aged samples were measured for color, degree of oxidation by absorption in the 1755 $cm^{-1}$ region (carbonyl region), and percent elongation at both room temperature and 200° C.

The E/TFE-I samples extruded were ones containing: a control (no additive), 5 ppm Cu as CuI, 50 ppm Cu as CuI, 500 ppm Cu as CuI, 5 ppm Cu as CuCl, 50 ppm Cu as CuCl, 50 ppm Cu metal powder, 50 ppm Cu as $Cu_2O$. The E/TFE-II samples extruded were ones containing: 0.25 ppm Cu as CuI, 5 ppm Cu as CuI, 5 ppm Cu as $Cu_2O$, and 50 ppm Cu as $Cu_2O$. The E/TFE-II powder served as a control.

Results—are shown in Table 4.

TABLE 4

EFFECT OF EXPOSURE TIME IN AIR AT 230° C. ON THE OXIDATION OF E/TFE-I AND E/TFE-II FILMS

| Example (number) or Comparison (letter) | Add. Type | Add. Conc. (as ppm Cu) | Absorbance (17755 $cm^{-1}$/MIL × 100 at Different Aging Times | | | | | |
|---|---|---|---|---|---|---|---|---|
| | | | Unaged | 16 hours | 30 hours | 64 hours | 200 hours | 400 hours |
| FOR E/TFE-1 | | | | | | | | |
| 4-1 | CuI | 5 | 0 | 0 | 0 | 0 | 3.09 | 11.28 |
| 4-2 | CuI | 50 | 0 | 0 | 0 | 0 | 0.510 | 11.78 |
| 4-3 | CuCl | 5 | 0 | 0 | 0 | 0 | 3.82 | 8.85 |

TABLE 4-continued
EFFECT OF EXPOSURE TIME IN AIR AT 230° C. ON THE OXIDATION OF E/TFE-I AND E/TFE-II FILMS

| Example (number) or Comparison (letter) | Add. Type | Add. Conc. (as ppm Cu) | Unaged | 16 hours | 30 hours | 64 hours | 200 hours | 400 hours |
|---|---|---|---|---|---|---|---|---|
| 4-4 | CuCl | 50 | 0 | 0 | 0 | 0 | 1.65 | 10.54 |
| A | None | 0 | 0 | 1.69 | 1.80 | 3.72 | 10.86 | 10.6 |
| B | Cu | 50 | 0 | 0 | 0 | 0.19 | 5.60 | 8.63 |
| C | Cu$_2$O | 50 | 0 | 0 | 0 | 0 | 2.51 | 10.95 |
| For E/TFE-II | | | | | | | | |
| 4-5 | CuI | 0.25 | 0 | 0 | 0 | 0 | 0.190 | 1.19 |
| 4-6 | CuI | 5 | 0 | 0 | 0 | 0 | 0.242 | 0.50 |
| D | None | 0 | 0 | 0.79 | 1.34 | 1.87 | 2.61 | 2.89 |
| E | Cu$_2$O | 5 | 0 | 0 | 0 | 0 | 0.180 | 0.40 |
| F | Cu$_2$O | 50 | 0 | 0 | 0 | 0 | 0.144 | 0.36 |

Add. Conc. Absorbance (17755 cm$^{-1}$/MIL × 100 at Different Aging Times)

I claim:

1. An ethylene/tetrafluoroethylene copolymer composition having good thermal stability which comprises (a) an ethylene/tetrafluoroethylene copolymer which contains 40 to 70 mol percent tetrafluoroethylene units and complementally 60–30 mol percent ethylene units and optionally, up to 20 mole percent units of at least one copolymerizable ethylenically unsaturated comonomer of 3–12 carbon atoms, and (b) from 0.05 to 500 ppm, based on parts of (a) and (b), cuprous iodide or cuprous chloride (as copper) free of other inorganic halide salts.

2. The composition of claim 1 wherein the copolymer contains units of ethylene, tetrafluoroethylene and hexafluoroacetone.

3. The composition of claim 1 wherein the copolymer contains units of ethylene, tetrafluoroethylene and perfluorobutyl ethylene.

4. The composition of claim 2 or 3 wherein the cuprous compound is cuprous iodide.

5. The composition of claim 2 or 3 wherein the cuprous compound is cuprous chloride.

6. The composition of claim 4 wherein the cuprous iodide is present in an amount of from 5 to 50 ppm.

7. The composition of claim 5 wherein the cuprous chloride is present in an amount of from 5 to 50 ppm.

* * * * *